(12) United States Patent
Ide (10) Patent No.: US 11,936,212 B2
(45) Date of Patent: Mar. 19, 2024

(54) CONTROL SYSTEM AND METHOD FOR CONTROLLING THE SAME

(71) Applicant: CANON KABUSHIKI KAISHA, Tokyo (JP)

(72) Inventor: Takeshi Ide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/048,770

(22) Filed: Oct. 21, 2022

(65) Prior Publication Data
US 2023/0127738 A1 Apr. 27, 2023

(30) Foreign Application Priority Data

Oct. 25, 2021 (JP) ................................. 2021-173776

(51) Int. Cl.
*H02J 50/20* (2016.01)
*G06F 1/08* (2006.01)
*G06F 1/10* (2006.01)
*H02J 50/80* (2016.01)

(52) U.S. Cl.
CPC ................ *H02J 50/80* (2016.02); *G06F 1/08* (2013.01); *G06F 1/10* (2013.01); *H02J 50/20* (2016.02)

(58) Field of Classification Search
CPC .. H02J 50/10; H02J 50/12; H02J 50/20; H02J 50/80
USPC ....................................................... 307/104
See application file for complete search history.

(56) References Cited

U.S. PATENT DOCUMENTS

| 4,837,556 A * | 6/1989 | Matsushita ............ H04B 14/00 398/100 |
| 2010/0270867 A1* | 10/2010 | Abe ........................ H02J 50/60 307/104 |
| 2016/0126747 A1* | 5/2016 | Kato ........................ H02J 50/10 307/104 |
| 2023/0008049 A1* | 1/2023 | Ide ............................ H02J 50/80 |
| 2023/0098740 A1* | 3/2023 | Asai ........................ H02J 50/20 307/142 |

FOREIGN PATENT DOCUMENTS

JP 2018054847 A 4/2018

* cited by examiner

*Primary Examiner* — William Hernandez
(74) *Attorney, Agent, or Firm* — Canon U.S.A., Inc. IP Division (57) ABSTRACT

A power transmission unit includes a switching unit configured to switch alternating-current (AC) power at a timing based on a first clock signal and wirelessly transmit the switched AC power, and a clock transmission unit configured to wirelessly transmit the first clock signal. A power reception unit includes a clock reception unit configured to receive the first clock signal, a detection unit configured to detect an amount of electric power and a switching timing of the AC power, a clock generation unit configured to generate a second clock signal based on the switching timing, a clock selection unit configured to select the first or second clock signal in accordance with the amount of electric power, and a rectifying unit configured to switch the AC power wirelessly transmitted by the switching unit at a timing based on the clock signal selected.

19 Claims, 7 Drawing Sheets

CONTROL SYSTEM AND METHOD FOR CONTROLLING THE SAME

BACKGROUND

Field

The present disclosure relates to a control system and a method for controlling the control system.

Description of the Related Art

In some systems, a motor is supplied with electric power in order to be driven. For example, a semiconductor exposure apparatus is provided with a coarse motion stage for moving a wafer to an exposure position, a micromotion stage for finely moving the wafer to form a pattern on the wafer, and a motor for moving the micromotion stage. The micromotion stage and the motor are mounted on the coarse motion stage. A power cable for supplying electric power for driving the motor is connected to the motor mounted on the coarse motion stage. This power cable is moved with the movement of the coarse motion stage, so that the tension of the power cable affects the positioning accuracy of the stage. Therefore, wireless transmission of power for driving the motor is expected.

The motor for moving the stage is to be applied with an alternating voltage for the following reason. This is because, for a movement of the stage on one axis, for example, a positive voltage is to be applied in order to move the stage in the positive direction and a negative voltage in order to move the stage in the negative direction. To move the micromotion stage, an alternating voltage is to be applied to the motor mounted on the coarse motion stage.

An alternating voltage to be applied to the motor is generally generated by a circuit called a motor driver. Applying a direct-current (DC) voltage and a control signal to the motor driver generates an alternating voltage to be applied to the motor. Japanese Patent Application Laid-Open No. 2018-54847 discusses a configuration of a motor wireless drive system in which a motor driver is disposed on a coarse motion stage, and an alternating voltage is applied to a motor mounted on the coarse motion stage through the wireless power transmission. The coarse motion stage is disposed on the power reception side of the wireless power transmission, and a power reception unit for the wireless power transmission is disposed on the coarse motion stage. By wirelessly transmitting a DC voltage to the power reception unit on the coarse motion stage and applying a DC voltage to the motor driver on the coarse motion stage, the system generates an alternating voltage to be applied to the motor mounted on the coarse motion stage to drive the motor.

In this configuration, a space for disposing the motor driver on the power reception side of the wireless power transmission is to be provided, resulting in a large-sized coarse motion stage. Therefore, the scale of a coarse motion stage control system is to be increased. It is demanded to supply suitable alternating-current (AC) power to a load.

SUMMARY

Various embodiments of the present disclosure are directed to supplying suitable AC power to a load.

According to one embodiment of the present disclosure, a control system includes a power transmission unit configured to wirelessly transmit alternating-current power, and a power reception unit configured to receive the alternating-current power wirelessly transmitted from the power transmission unit. The power transmission unit includes a first switching unit configured to switch the alternating-current power at a timing based on a first clock signal and wirelessly transmit the switched alternating-current power, and a clock transmission unit configured to wirelessly transmit the first clock signal. The power reception unit includes a clock reception unit configured to receive the first clock signal wirelessly transmitted from the clock transmission unit, a first detection unit configured to detect an amount of electric power and a switching timing of the alternating-current power wirelessly transmitted by the first switching unit, a first clock generation unit configured to generate a second clock signal based on the switching timing detected by the first detection unit, a first clock selection unit configured to select a clock signal based on the first or second clock signal output from the clock reception unit in accordance with the amount of electric power detected by the first detection unit, and a first rectifying unit configured to switch the alternating-current power wirelessly transmitted by the first switching unit at a timing based on the clock signal selected by the first clock selection unit.

Further features of the present disclosure will become apparent from the following description of example embodiments with reference to the attached drawings.

DESCRIPTION OF THE EMBODIMENTS

Example embodiments will be described in detail below with reference to the accompanying drawings. The following example embodiments do not limit the scope of the claims. Although a plurality of features is described in the example embodiments, not all of the plurality of features is indispensable to every embodiment of the present disclosure, and the plurality of features may be combined optionally. In the accompanying drawings, identical or similar components are assigned the same reference numerals, and duplicated descriptions thereof will be omitted.

[System Configuration]

Figure 1:
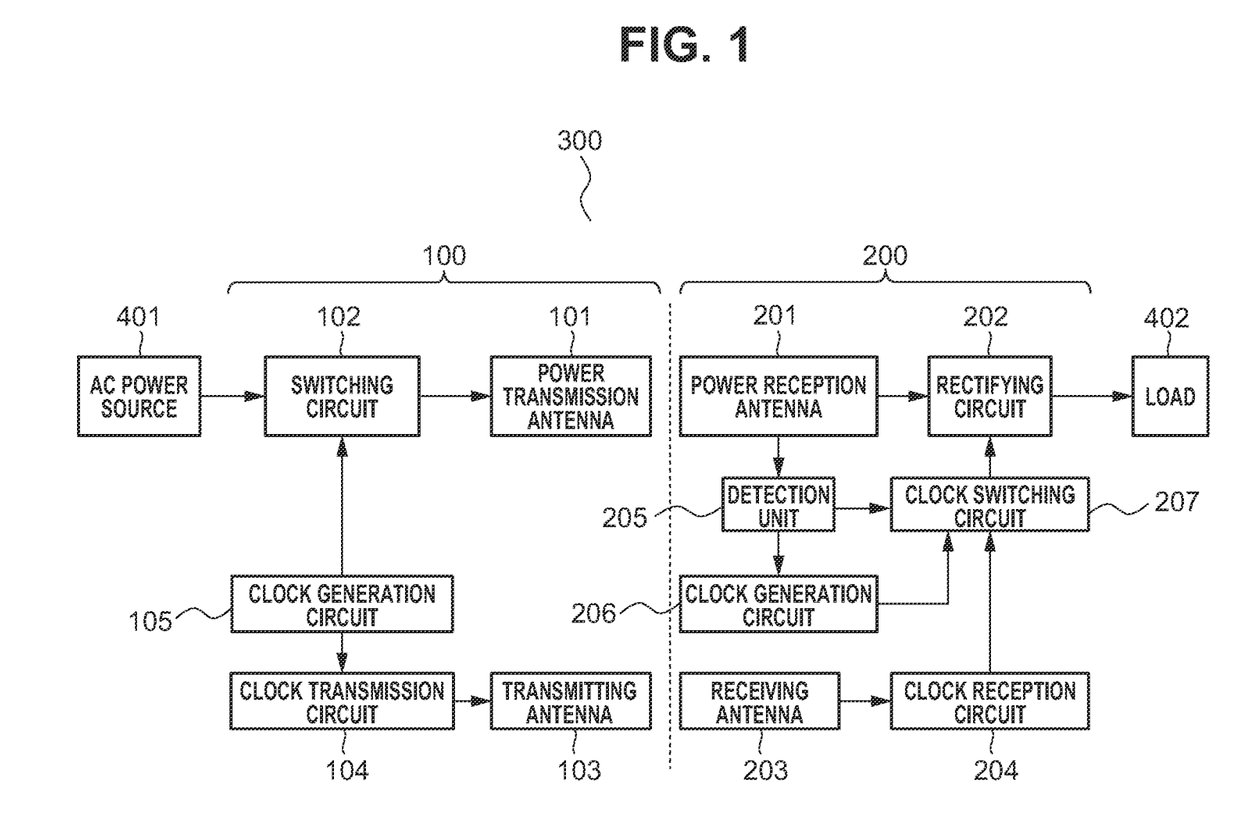
FIG. 1 is a block diagram illustrating an example configuration of a control system.

A first example embodiment of the present disclosure will be described. FIG. 1 is a block diagram illustrating an example configuration of a control system 300 according to the first example embodiment.

The control system 300 includes a power transmission unit 100, a power reception unit 200, an alternating-current (AC) power source 401, and a load 402. The power transmission unit 100 and the power reception unit 200 are not physically connected to each other. Electric power is contactlessly transmitted from a power transmission antenna 101 to a power reception antenna 201, and a clock signal is contactlessly transmitted from a transmitting antenna 103 to a receiving antenna 203. The power transmission antenna 101 and the power reception antenna 201 are coupled through magnetic field coupling. In contrast, the transmitting antenna 103 and the receiving antenna 203 are coupled through electric field coupling. A method for controlling the control system 300 will be described below.

The power transmission unit 100 includes the power transmission antenna 101 and a switching circuit 102. The switching circuit 102 switches the alternating voltage supplied from the AC power source 401 with a frequency higher than the frequency of the alternating voltage supplied from the AC power source 401, and transmits the resultant alternating voltage to the power transmission antenna 101. The power transmission antenna 101 wirelessly transmits power to the power reception antenna 201.

The switching circuit 102 includes a bidirectional switch to switch the alternating voltage to be supplied. The switching circuit 102 includes, for example, two different Field Effect Transistors (FETs) with the sources connected to each other and the gates connected to each other. The bidirectional switch can switch the alternating voltage because the body diodes of the two FET do not turn ON even if the positive or the negative voltage is applied across the drains of the two FETs. Applying a voltage across the gate and the source of the respective two FETs turns the voltage across the drains of the two FETs ON and OFF.

The power transmission unit 100 includes the transmitting antenna 103, a clock transmission circuit 104, and a first clock generation circuit 105. The first clock generation circuit 105 generates a first clock signal and transmits the generated first clock signal to the transmitting antenna 103 via the clock transmission circuit 104. The transmitting antenna 103 wirelessly transmits the first clock signal to the receiving antenna 203. The first clock generation circuit 105 transmits the first clock signal also to the switching circuit 102 to control the switching timing of the switching circuit 102.

The power reception unit 200 includes the power reception antenna 201 and a rectifying circuit 202. The power reception antenna 201 wirelessly receives an AC power transmitted from the power transmission antenna 101. The rectifying circuit 202 rectifies the AC power wirelessly received from the power reception antenna 201 to restore the original waveform of the alternating voltage supplied by the AC power source 401, and outputs the restored alternating voltage to the load 402. The switching circuit 102, the power transmission antenna 101, the power reception antenna 201, and the rectifying circuit 202 form a resonance circuit to wirelessly transmit power in an efficient way.

The rectifying circuit 202 switches the alternating voltage in synchronization with the switching circuit 102 to rectify the alternating voltage switched by the switching circuit 102 and restores the alternating voltage supplied from the AC power source 401. The rectifying circuit 202 includes a bidirectional switch similar to the switching circuit 102 to output the alternating voltage to the load 402. The switching circuit 102 and the rectifying circuit 202 using a bidirectional switch enable the wireless power transmission of a desired alternating voltage to be applied to the load 402 by the AC power source 401. The load 402 is, for example, a voice coil motor that physically performs a displacement operation when applied with an alternating current.

According to Japanese Patent Application Laid-Open No. 2018-54847, the alternating voltage for controlling the moving direction of the micromotion stage that is to be driven by the motor serving as the load 402 is generated by the power reception unit 200, and a direct-current (DC) voltage is applied to the power transmission unit 100 by a DC power source. A DC voltage is supplied to the power reception unit 200 through the wireless power transmission, and is supplied to the motor driver in the power reception unit 200. The motor driver generates the alternating voltage to be applied to the motor, to control the moving direction of the micromotion stage. The DC voltage is controlled to be maintained constant to apply a high-accuracy alternating voltage to the motor.

In the control system 300 according to the first example embodiment, in contrast, the power reception unit 200 not including the motor driver is small in size, unlike the configuration in Japanese Patent Application Laid-Open No. 2018-54847. The AC power source 401 corresponds to the motor driver in Japanese Patent Application Laid-Open No. 2018-54847. The power transmission unit 100 is applied with an alternating voltage for controlling the moving direction of the micromotion stage generated by the AC power source 401. The alternating voltage is then supplied to the power reception unit 200 through the wireless power transmission via the switching circuit 102, restored to the original alternating voltage waveform by the rectifying circuit 202, and then applied to the load 402 serving as a motor for moving the micromotion stage.

The power reception unit 200 includes a detection unit 205, a second clock generation circuit 206, and a clock switching circuit 207. The detection unit 205 detects the amount of electric power and the timing of the AC power received by the power reception antenna 201. The waveform of the alternating voltage received by the power reception antenna 201 is the resultant of the switching circuit 102 switching the waveform of the alternating voltage applied by the AC power source 401. The amount of electric power to be detected by the detection unit 205 refers to the magnitude of the amplitude of the alternating voltage received by the power reception antenna 201, the amplitude of the alternating current, or the amplitude of the AC power calculated based on the amplitudes of the alternating voltage and the alternating current. The detection timing refers to the timing when the waveform of the alternating voltage received by the power reception antenna 201, the alternating current, or the AC power calculated based on the alternating voltage and current becomes close to zero. The second clock generation circuit 206 generates a second clock signal based on the timing detected by the detection unit 205 and transmits the second clock signal to the clock switching circuit 207.

The power reception unit 200 includes the receiving antenna 203 and a clock reception circuit 204. The receiving antenna 203 wirelessly receives the first clock signal transmitted by the transmitting antenna 103. The clock reception circuit 204 shapes the waveform of the first clock signal wirelessly received by the receiving antenna 203 and transmits the first clock signal subjected to waveform shaping to the clock switching circuit 207.

The clock switching circuit 207 selects either the input first or the input second clock signal and outputs the selected signal to the rectifying circuit 202. The rectifying circuit 202 switches the alternating voltage received by the power reception antenna 201 based on the selected first or second clock signal to restore the alternating voltage supplied from the AC power source 401 and then supplies the alternating voltage to the load 402.

Figure 2:
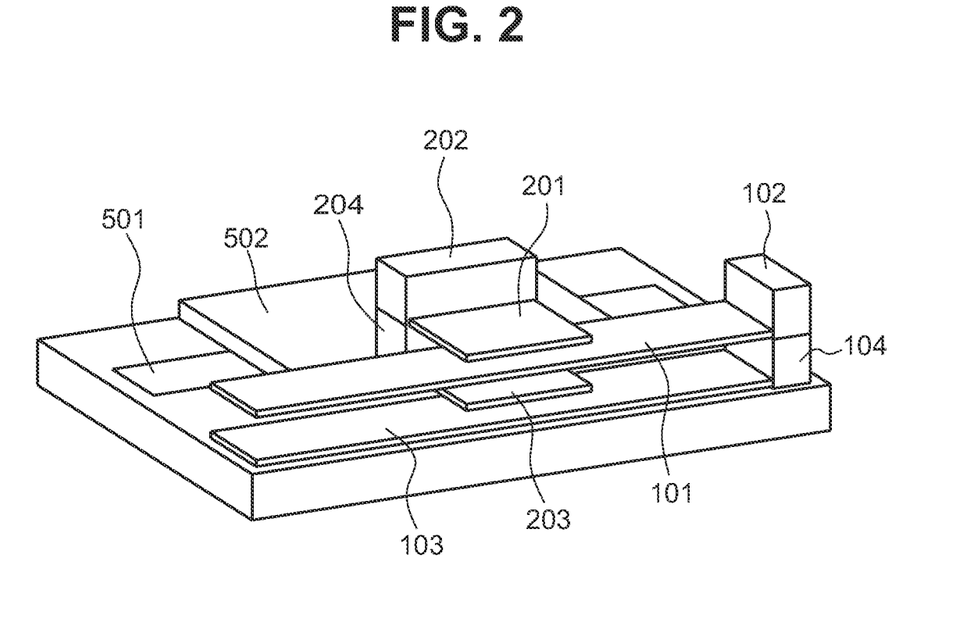
FIG. 2 is a perspective view illustrating an example configuration of the control system.

FIG. 2 is a perspective view illustrating an example configuration of the control system 300 according to the first example embodiment. The power reception antenna 201 and the rectifying circuit 202 are mounted on a stage 502 that is slidably moved on one axis by a linear motor 501. The stage 502 is, for example, a coarse motion stage. The power transmission antenna 101 is longer than the power reception antenna 201. The power transmission antenna 101 and the power reception antenna 201 contactlessly face each other regardless of the position on the stage 502 with respect to the movement of the stage 502. This enables the power reception antenna 201 to wirelessly receive power from the power transmission antenna 101 regardless of the position of the stage 502.

The receiving antenna 203 and the clock reception circuit 204 are mounted on the stage 502 in a similar way. The transmitting antenna 103 is longer than the receiving antenna 203. The transmitting antenna 103 and the receiving antenna 203 contactlessly face each other regardless of the position on the stage 502 with respect to the movement of the stage 502. This enables the receiving antenna 203 to wirelessly receive a clock signal from the transmitting antenna 103 regardless of the position on the stage 502.

[Role of Clock Switching Circuit]

The clock switching circuit 207 selects either the input first or the input second clock signal and outputs the selected signal to the rectifying circuit 202. The clock switching circuit 207 selects either the first or second clock signal based on the amount of electric power detected by the detection unit 205. In a case where the amount of electric power detected by the detection unit 205 is larger than a threshold value, the clock switching circuit 207 selects the second clock signal. In a case where the amount of electric power detected by the detection unit 205 is smaller than the threshold value, the clock switching circuit 207 selects the first clock signal. The threshold value is set in advance.

Figure 3A:
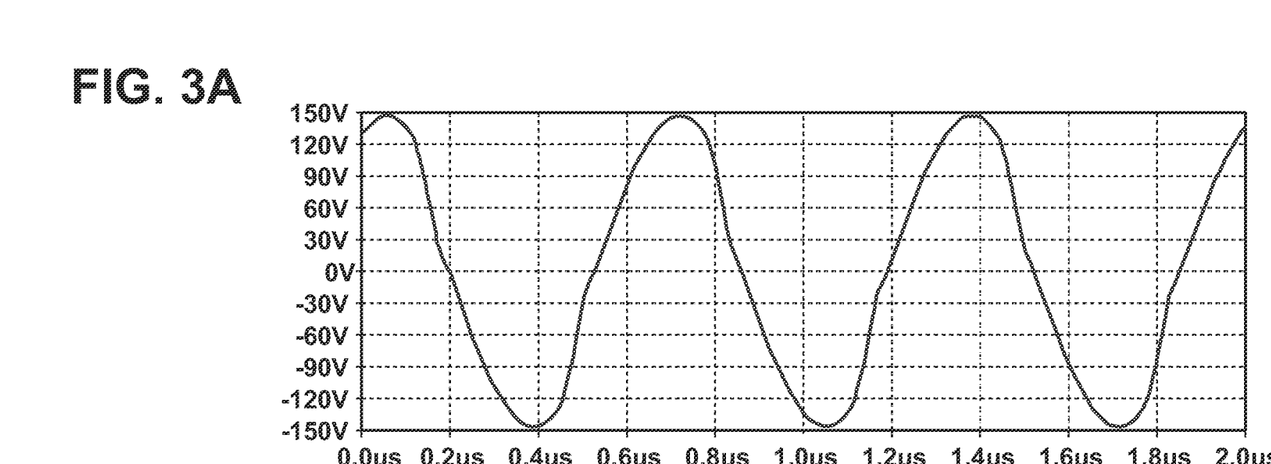
FIGS. 3A and 3B are each a diagram illustrating a power reception antenna and voltage waveforms generated in a receiving antenna.

The reason why this selection is made will be described below. In a case where the detected amount of electric power is larger than the threshold value, in other words, in a case where the amount of electric power to be supplied from the AC power source 401 to the load 402 is larger than the threshold value, the power transmission antenna 101 and the power reception antenna 201 also generate a high voltage. For example, FIG. 3A illustrates a result of simulation of a waveform of a voltage generated in the power reception antenna 201 in a case where a 45V DC voltage is transmitted to the 9-ohm load 402 through the wireless power transmission. The switching circuit 102 has a switching frequency of 1.51 MHz, the power transmission antenna 101 has an inductance of 1.8 µH, and the power reception antenna 201 has an inductance of 0.98 µH. Referring to the chart in FIG. 3A, the power reception antenna 201 generates a voltage of about 290 Vpp due to resonance.

Figure 3B:
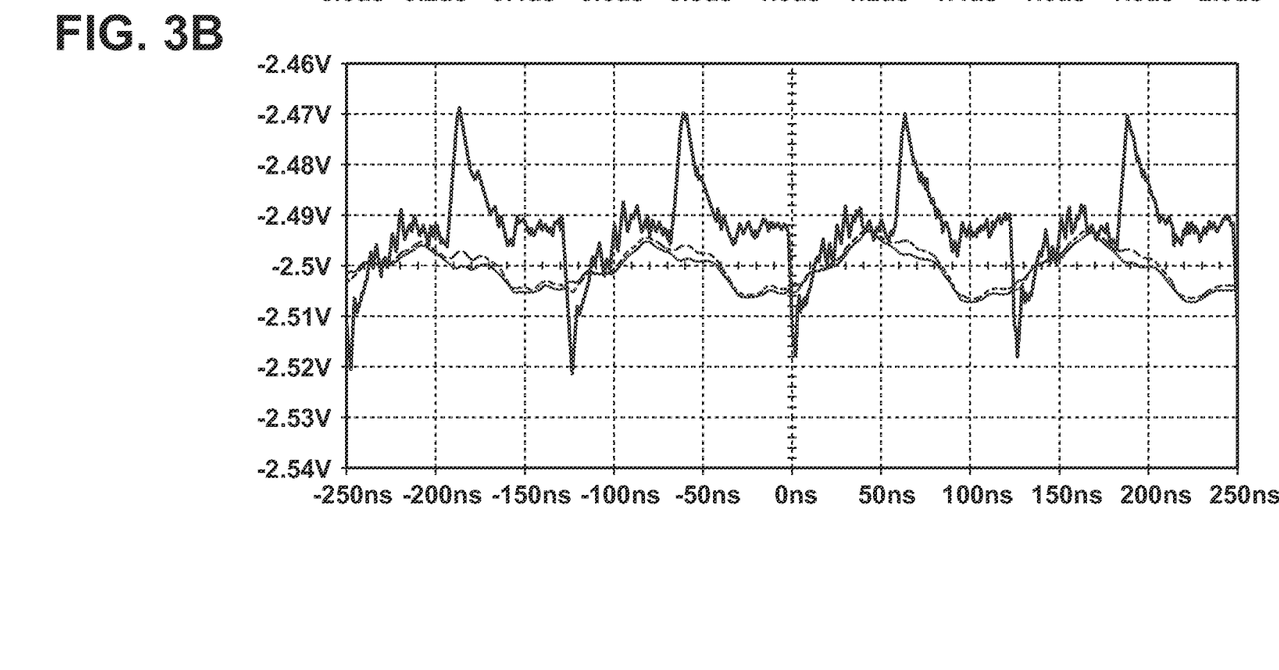

In contrast to this, the clock signal received by the receiving antenna 203 has a small amplitude because the clock signal attenuates between the transmitting antenna 103 and the receiving antenna 203. For example, FIG. 3B illustrates a result of measurement of the waveform of the voltage received by the clock reception circuit 204 in a case where the transmitting antenna 103 is applied with an 8-MHz 10-Vpp clock signal. A comparator circuit is used as an example of the clock reception circuit 204. Referring to the chart in FIG. 3B, the two different waveforms around −2.5 V indicate the voltage waveforms of the positive and the negative sides of the comparator circuit, and the vertically sharp waveform indicates the difference between the two waveforms, that is, a differential input waveform of the comparator circuit. Referring to the chart in FIG. 3B, the differential input waveform of the comparator circuit, that is, the voltage of the signal received by the receiving antenna 203 and then transmitted to the clock reception circuit 204 has an amplitude of about only 25 mV.

The power reception antenna 201 and the receiving antenna 203 where these voltages are generated closely disposed, as illustrated in FIG. 2. To reduce the load of the linear motor 501 and reduce the inertia generated by the movement of the stage 502 itself, it is demanded that the stage 502 where the power reception unit 200 is disposed is as small as possible. Thus, the power reception antenna 201 and the receiving antenna 203 of the power reception unit 200 are to be closely disposed in an as small space as possible. In such a case, electromagnetic interference occurs between the power reception antenna 201 and the receiving antenna 203, and noise having a large amplitude caused by the power reception antenna 201 is superimposed on a signal having a small amplitude to be transmitted to the clock reception circuit 204, possibly disturbing correct waveform shaping in the clock reception circuit 204. Accordingly, an error such as missing bits may possibly occur in the first clock signal output by the clock reception circuit 204, and the clock signal may become defective. As a result, the synchronization cannot be achieved between the switching of the switching circuit 102 and the switching of the rectifying circuit 202, and the rectifying circuit 202 may be unable to correctly restore the AC power waveform.

In contrast, a high voltage is generated in the power reception antenna 201, so that the detection unit 205 correctly detects the amount of electric power and the timing, and therefore the second clock generation circuit 206 correctly generates the second clock signal. The detection unit 205 detects a large amount of electric power.

In a case where a large amount of electric power is detected by the detection unit 205, the clock switching circuit 207 selects the correctly generated second clock signal and outputs the selected signal to the rectifying circuit 202, enabling the switching circuit 102 and the rectifying circuit 202 to perform switching in synchronization. As a result, the rectifying circuit 202 can restore the alternating voltage supplied from the AC power source 401 with high accuracy.

A case where a small amount of electric power is supplied from the AC power source 401 to the load 402 will be described below. In this case, a low voltage is generated in the power transmission antenna 101 and the power reception antenna 201, and a small amount of noise is superimposed on the receiving antenna 203. Therefore, the first clock signal is hardly affected by noise. As a result, the clock reception circuit 204 can output the first clock signal subjected to correct waveform shaping.

Since a low voltage is generated in the power reception antenna 201, the detection unit 205 detects a small amount of electric power. Further, a low voltage is generated in the power reception antenna 201. Thus, if the generated voltage is lower than the detection limit of the detection unit 205, the detection unit 205 may possibly be unable to detect timing. When the original electric power to be supplied from the AC power source 401 to the load 402 fluctuates between the positive and negative sides around zero, the waveform may be unable to be distinguished from the switching timing of the switching circuit 102 that normally provides a waveform close to zero. Accordingly, an error such as missing bits may occur in the second clock signal generated by the second clock generation circuit 206 based on the timing detected by the detection unit 205, and the second clock signal may become defective. As a result, the synchronization cannot be achieved between the switching of the switching circuit 102 and the switching of the rectifying circuit 202, and the rectifying circuit 202 may be unable to correctly restore the AC power waveform.

In a case where a small amount of electric power is detected by the detection unit 205, the clock switching circuit 207 selects the correctly generated first clock signal and outputs the selected signal to the rectifying circuit 202, enabling the switching circuit 102 and the rectifying circuit 202 to perform switching in synchronization. This enables the rectifying circuit 202 to restore the alternating voltage supplied from the AC power source 401 with high accuracy.

In a case where the voltage generated in the power reception antenna 201 is a low voltage below the detection limit of the detection unit 205, noise superimposed on the signal of the receiving antenna 203 through electromagnetic interference is inevitably smaller than the detection limit. Thus, noise does not affect the waveform shaping of the clock reception circuit 204. On the contrary, in a case where the voltage generated in the power reception antenna 201 exceeds the detection limit of the detection unit 205, the second clock generation circuit 206 is able to generate a correct second clock signal. Therefore, there are only two different cases, specifically, a case where the first clock signal is correct and a case where the second clock signal is correct.

As described above, the clock switching circuit 207 selects the correct first clock signal or the correct second clock signal based on the amount of electric power detected by the detection unit 205 and outputs the selected signal. The control system 300 prevents a clock signal error due to electromagnetic interference, enables the switching circuit 102 and the rectifying circuit 202 to perform switching in synchronization regardless of the amount of electric power to be supplied to the load 402, and restores the alternating voltage supplied from AC power source 401, with high accuracy.

[Synchronization Between Switching Circuit and Rectifying Circuit]

Both the first and second clock signals to be input to the clock switching circuit 207 originate from the clock signal generated by the first clock generation circuit 105, and thus, have the same frequency. However, the first and second clock signals pass through different paths, and thus are not necessarily in phase with each other. The switching timing demanded for the switching operation of the rectifying circuit 202 is the switching timing of the voltage generated in the power reception antenna 201 which is a target of switching. Thus, the switching timing demanded for the rectifying circuit 202 is the switching timing detected by the detection unit 205 from the voltage generated in the power reception antenna 201. Thus, before switching, the clock switching circuit 207 may shift the phase of the first clock signal output from the clock reception circuit 204 so as to be in phase with the switching timing detected by the detection unit 205.

In a case where the clock switching circuit 207 shifts the phase of the first clock signal so as to be in phase with the second clock signal, if a small amount of electric power is supplied to the load 402, the detection unit 205 may be unable to detect a voltage below the detection limit of the detection unit 205, as described above. In a case where the electric power supplied to the load 402 fluctuates between the positive and negative sides around zero, the waveform may not be distinguished from the switching timing of the switching circuit 102 to be detected by the detection unit 205. In such a case, the detection unit 205 may be unable to detect a correct switching timing, and the clock switching circuit 207 may be unable to correctly shift the phase of the first clock signal so as to be in phase with the second clock signal.

To avoid such a situation, the control system 300 may perform an initial operation for establishing the synchronization between the switching circuit 102 and the rectifying circuit 202 before starting a sequence for supplying desired electric power to the load 402. More specifically, the control system 300 outputs electric power with a magnitude at which sufficient timing detection is realized by the detection unit 205, from the AC power source 401 as an initial operation of the control system 300. At this timing, the clock switching circuit 207 shifts the phase of the first clock signal so as to be in phase with the second clock signal. Subsequently, the clock switching circuit 207 maintains this amount of phase shift. This configuration enables the first and second clock signals to constantly be in phase with each other even after a sequence for supplying desired electric power to the load 402 is started. Thus, even after the clock switching circuit 207 selects whichever clock signal, the synchronization between the switching timing of the switching circuit 102 and the switching timing of the rectifying circuit 202 can be maintained. This enables restoring the alternating voltage supplied from the AC power source 401, with high accuracy.

As described above, the power transmission unit 100 wirelessly transmits the AC power. The power reception unit 200 receives the AC power wirelessly transmitted from the power transmission unit 100. The clock generation circuit 105 serving as a clock generation unit generates the first clock signal. The switching circuit 102 serving as a switching unit switches the AC power of the AC power source 401 at a timing based on the first clock signal generated by the clock generation circuit 105, and wirelessly transmits the switched AC power via the power transmission antenna 101. The clock transmission circuit 104 serving as a clock transmission unit wirelessly transmits the first clock signal generated by the clock generation circuit 105, via the transmitting antenna 103.

The clock reception circuit 204 serving as a clock reception unit receives the first clock signal wirelessly transmitted from the clock transmission circuit 104, via the receiving antenna 203. The detection unit 205 detects the amount of electric power and the switching timing of the AC power wirelessly transmitted by the switching circuit 102. The clock generation circuit 206 generates the second clock signal based on the switching timing detected by the detection unit 205.

In a case where the amount of electric power detected by the detection unit 205 is a first amount of electric power, the clock switching circuit 207 serving as a clock selection unit selects the second clock signal generated by the clock generation circuit 206. In a case where the amount of electric power detected by the detection unit 205 is a second amount of electric power that is smaller than the first amount of electric power, the clock switching circuit 207 selects a clock signal based on the first clock signal output from the clock reception circuit 204.

The rectifying circuit 202 serving as a rectifying unit switches the AC power wirelessly transmitted from the switching circuit 102, at a timing based on the clock signal selected by the clock switching circuit 207.

The clock switching circuit 207 may shift the phase of the first clock signal output from the clock reception circuit 204 so as to be in phase with the switching timing detected by the detection unit 205. In such a case, for the amount of electric power detected by the detection unit 205 being the second amount of electric power, the clock switching circuit 207 selects the above-described clock signal subjected to the phase shifting.

The clock switching circuit 207 shifts the phase of the first clock signal so as to be in phase with the switching timing detected by the detection unit 205 during a time period immediately after the activation of the control system 300. Subsequently, the control system 300 can maintain the amount of phase shift of the phase shifting. During the time period immediately after the activation of the control system 300, the AC power wirelessly transmitted by the switching circuit 102 is higher than the lower limit of the detection limit of the detection unit 205.

In a case where the amount of electric power detected by the detection unit 205 is larger than a threshold value, the clock switching circuit 207 selects the second clock signal generated by the clock generation circuit 206. In a case where the amount of electric power detected by the detection unit 205 is smaller than the threshold value, the clock switching circuit 207 selects a clock signal based on the first clock signal output from the clock reception circuit 204.

Two different threshold values may be provided. In a case where the amount of electric power detected by the detection unit 205 is larger than a first threshold value, the clock switching circuit 207 selects the second clock signal generated by the clock generation circuit 206. In a case where the amount of electric power detected by the detection unit 205 is smaller than a second threshold value, the clock switching circuit 207 selects a clock signal based on the first clock signal output from the clock reception circuit 204. In a case where the amount of electric power detected by the detection unit 205 is smaller than the first threshold value and larger than the second threshold value, the clock switching circuit 207 selects a clock signal which is the sum of the first clock signal output from the clock reception circuit 204 and the second clock signal.

The above-described threshold values may have a hysteresis characteristic. This enables prevention of chattering which occurs in a case where the amount of electric power detected by the detection unit 205 frequently exceeds the threshold value.

Each of the switching circuit 102 and the rectifying circuit 202 performs switching by using a bidirectional switch. As illustrated in FIG. 2, the power reception antenna 201 is relatively movable with respect to the power transmission antenna 101. The receiving antenna 203 is relatively movable with respect to the transmitting antenna 103.

According to the present example embodiment, for example, the control system 300 is enabled to apply an alternating voltage to the motor on the coarse motion stage 502 through the wireless power transmission, making it possible to reduce the power reception unit 200 in size. In a case where the detection unit 205 detects a large amount of electric power, a large amount of noise is superimposed on the first clock signal in the receiving antenna 203. In contrast, in a case where the detection unit 205 detects a small amount of electric power, a small amount of noise is superimposed on the first clock signal in the receiving antenna 203. By selecting a clock signal according to the amount of electric power detected by the detection unit 205, the clock switching circuit 207 suitably controls the switching timing of the rectifying circuit 202 to apply the wirelessly transmitted alternating voltage to the load 402 with high accuracy.

Figure 4:
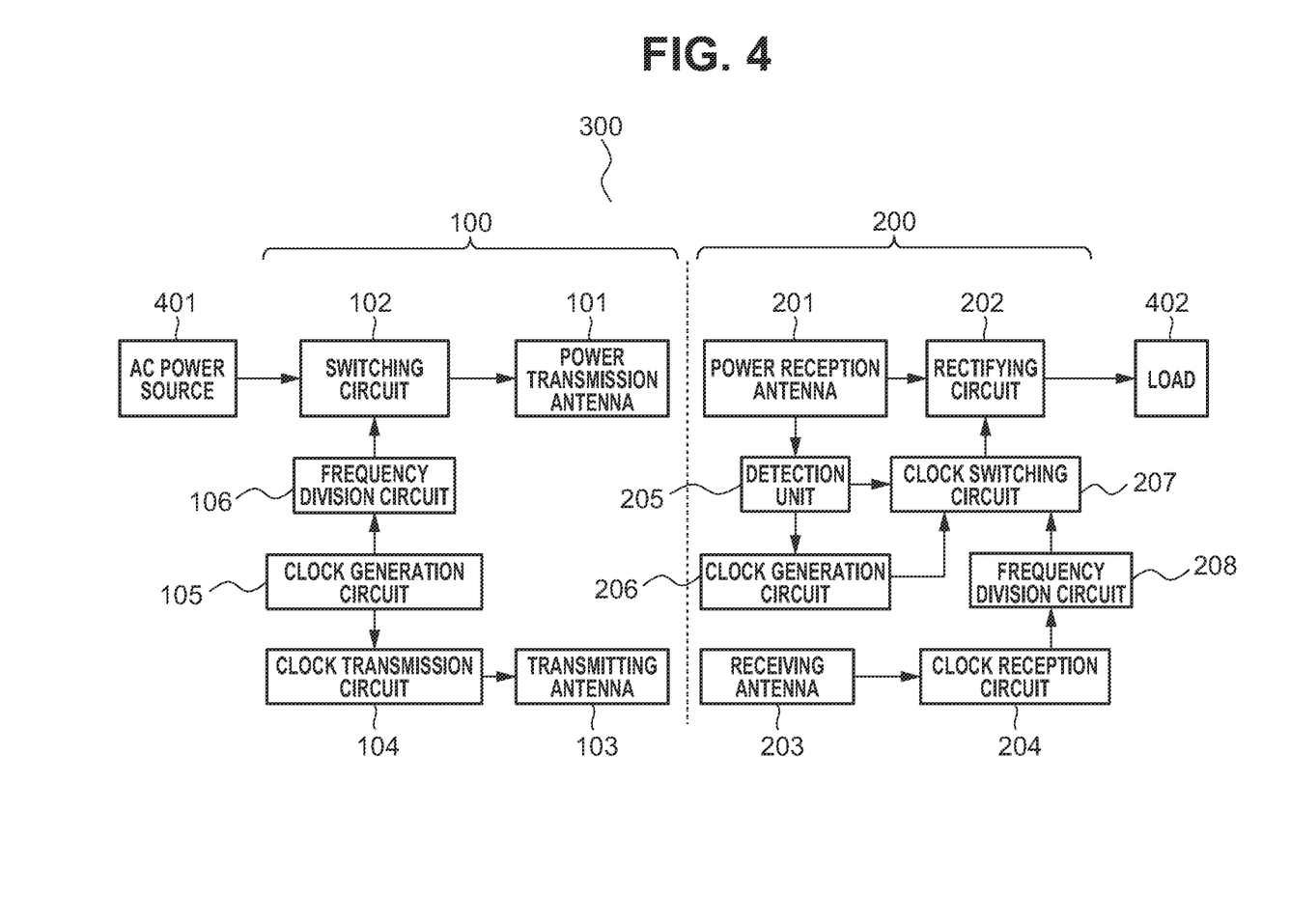
FIG. 4 is a block diagram illustrating an example configuration of a control system.

A second example embodiment of the present disclosure will be described below. FIG. 4 is a block diagram illustrating an example configuration of the control system 300 according to the second example embodiment.

The control system 300 in FIG. 4 includes the control system 300 in FIG. 1 and additionally includes a first frequency division circuit 106 and a second frequency division circuit 208. The power transmission unit 100 includes the first frequency division circuit 106, and the power reception unit 200 includes the second frequency division circuit 208. Differences of the second example embodiment from the first example embodiment will be described below.

The first clock generation circuit 105 of the power transmission unit 100 generates the first clock signal and then transmits the generated first clock signal to the first frequency division circuit 106. The first frequency division circuit 106 divides the frequency of the first clock signal to change the frequency of the first clock signal, and transmits the clock signal after the frequency division to the switching circuit 102 to control the switching timing of the switching circuit 102. The switching circuit 102 performs switching by using the clock signal of the frequency changed by the first frequency division circuit 106. Thus, the frequency of the switching timing detected by the detection unit 205 is also the one changed by the first frequency division circuit 106. Similarly, the frequency of the second clock signal generated by the second clock generation circuit 206 based on the timing detected by the detection unit 205 and then transmitted to the clock switching circuit 207 is also the one changed by the first frequency division circuit 106.

The clock reception circuit 204 of the power reception unit 200 transmits the first clock signal to the second frequency division circuit 208. The second frequency division circuit 208 divides the frequency of the first clock signal to change the frequency of the first clock signal to the same frequency as the frequency resultant from the change in the first frequency division circuit 106, and then transmits the first clock signal after the frequency division to the clock switching circuit 207.

The frequencies of both the first and second clock signals transmitted to the clock switching circuit 207 have been changed by the first frequency division circuit 106 and the second frequency division circuit 208, respectively, and are identical. However, as in the first example embodiment, the first and second clock signals are not necessarily in phase with each other. Thus, before switching, the clock switching circuit 207 may shift the phase of the first clock signal output from the second frequency division circuit 208 so as to be in phase with the switching timing of the changed frequency detected by the detection unit 205.

Providing the first frequency division circuit 106 and the second frequency division circuit 208 enables the switching circuit 102 and the rectifying circuit 202 to perform synchronized switching at a certain frequency. This enables the control system 300 to wirelessly supply electric power output from a plurality of independent AC power sources 401 to a plurality of independent loads 402 at different frequencies at the same time.

Figure 5:
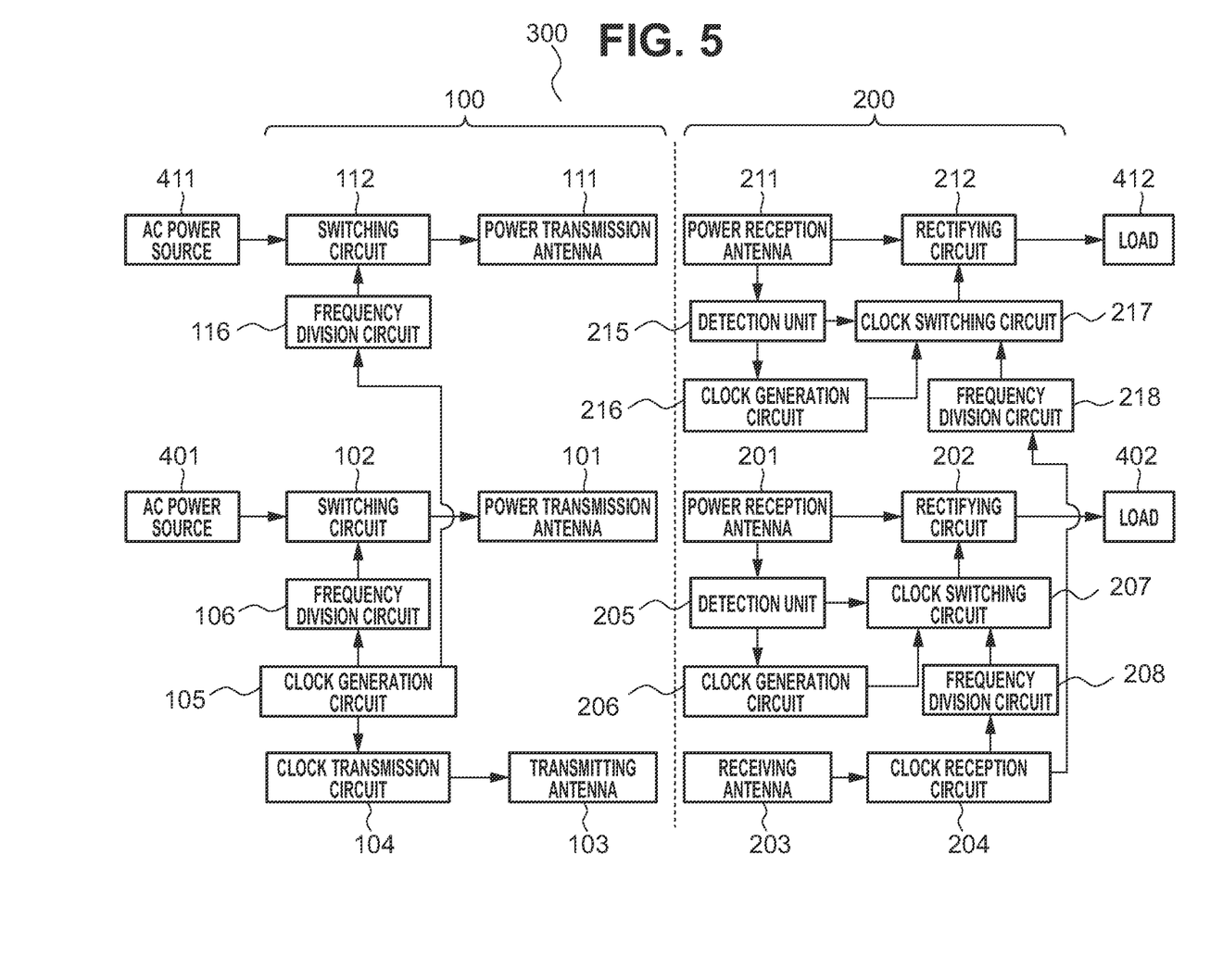
FIG. 5 is a block diagram illustrating an example configuration of a control system.

FIG. 5 is a block diagram illustrating an example configuration of the control system 300 according to the second example embodiment in which electric power output from the AC power source 401 and an AC power source 411, which are the two independent sets, is supplied to the load 402 and a load 412, which are the two independent sets, respectively, at different frequencies at the same time.

The control system 300 in FIG. 5 includes the control system 300 in FIG. 4, and additionally includes the AC power source 411, a power transmission antenna 111, a switching circuit 112, and a first frequency division circuit 116. Moreover, in addition to the components in the control system 300 in FIG. 4, the control system 300 in FIG. 5 further includes a power reception antenna 211, a rectifying circuit 212, a detection unit 215, a second clock generation circuit 216, a clock switching circuit 217, a second frequency division circuit 218, and the load 412.

The power transmission unit 100 includes the power transmission antenna 111, the switching circuit 112, and the first frequency division circuit 116. The power reception unit 200 includes the power reception antenna 211, the rectifying circuit 212, the detection unit 215, the second clock generation circuit 216, the clock switching circuit 217, and the second frequency division circuit 218.

The switching circuit 112 switches the alternating voltage supplied from the AC power source 411 at a frequency higher than the frequency of the alternating voltage supplied from the AC power source 411, and transmits the alternating voltage to the power transmission antenna 111. The power transmission antenna 111 wirelessly transmits electric power to the power reception antenna 211. The first clock generation circuit 105 transmits the generated first clock signal to the first frequency division circuits 106 and 116. The first frequency division circuit 106 divides the frequency of the first clock signal to change the frequency of the first clock signal, and transmits the clock signal after the frequency division to the switching circuit 112 to control the switching timing of the switching circuit 112.

The power reception antenna 211 wirelessly receives the AC power transmitted from the power transmission antenna 111.

The rectifying circuit 212 rectifies the AC power wirelessly received from the power reception antenna 211 to restore the original alternating voltage waveform supplied by the AC power source 411, and outputs the restored alternating voltage to the load 412.

The detection unit 215 detects the amount of electric power and the timing of the AC power received by the power reception antenna 211. The second clock generation circuit 216 generates the second clock signal based on the timing detected by the detection unit 215 and transmits the generated second clock signal to the clock switching circuit 217.

The clock reception circuit 204 transmits the first clock signal to the second frequency division circuits 208 and 218. The second frequency division circuit 208 divides the frequency of the first clock signal to change the frequency of the first clock signal to the same frequency as that in the first frequency division circuit 116, and transmits the first clock signal after the frequency division to the clock switching circuit 217.

In a case where the amount of electric power detected by the detection unit 215 is larger than a threshold value, the clock switching circuit 217 selects the second clock signal. In a case where the amount of electric power detected by the detection unit 215 is smaller than the threshold value, the clock switching circuit 217 selects the first clock signal. The clock switching circuit 217 then outputs the selected first or second clock signal to the rectifying circuit 212. The rectifying circuit 212 switches the alternating voltage received by the power reception antenna 211 based on the selected first or second clock signal to restore the alternating voltage supplied from the AC power source 411, and supplies the alternating voltage to the load 412.

In contrast to the control system 300 in FIG. 4, in the control system 300 in FIG. 5, while the first clock generation circuit 105, the clock transmission circuit 104, the transmitting antenna 103, the receiving antenna 203, and the clock reception circuit 204 are one common set, two sets of the other units are included. One clock signal contactlessly transmitted by using the transmitting antenna 103 and the receiving antenna 203 in one common set enables synchronization between the switching circuit 102 and the rectifying circuits 202 and between the switching circuit 112 and the rectifying circuit and 212 which are two independent sets. This enables the control system 300 to wirelessly supply electric power output from the AC power sources 401 and 411, which are two independent sets, to the loads 402 and 412, which are two independent sets, respectively, at different frequencies at the same time.

Figure 6:
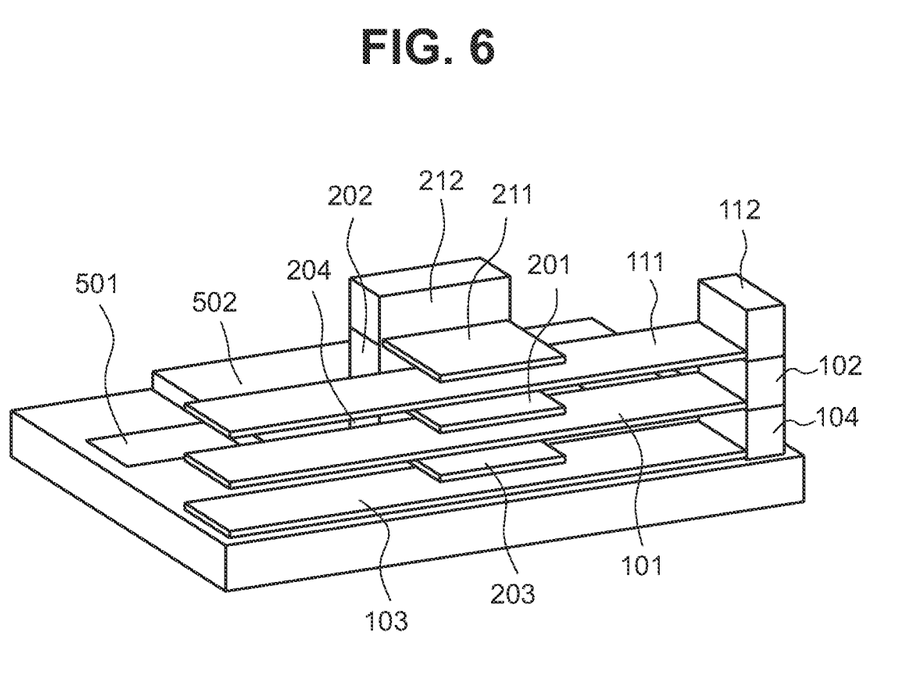
FIG. 6 is a perspective view illustrating an example configuration of the control system.

Advantages of different frequencies will be described below. FIG. 6 is a perspective view illustrating an example configuration of the control system 300 according to the second example embodiment in which electric power output from the AC power sources 401 and 411, which are two independent sets, is supplied to the load 402 and 412, which are two independent sets, respectively, at different frequencies at the same time. The added switching circuit 112 and the added power transmission antenna 111 are disposed above the switching circuit 102 and the power transmission antenna 101, respectively. The added power reception antenna 211 and the added rectifying circuit 212 are disposed above the power reception antenna 201 and the added rectifying circuit 202, respectively. As described above, it is demanded that the stage 502 where the power reception unit 200 is to be disposed is as small as possible to reduce the load on the linear motor 501 and reduce the inertia generated by the movement of the stage 502 itself. Thus, the power reception antenna 201 and the added power reception antenna 211 of the power reception unit 200 are to be closely disposed in an as small space as possible. Accordingly, there may be a case where electromagnetic interference occurs between the power reception antenna 201 and the power reception antenna 211, AC power of the respective two antennas is superimposed on each other, and none of the loads 402 and 412 may be supplied with correct AC power.

However, the switching frequencies of the voltages generated in the power reception antennas 201 and 211 are differentiated by differentiating the frequency between the first frequency division circuits 106 and 116 and similarly differentiating the frequency between the second frequency division circuits 208 and 218. Further, since the switching frequencies of the rectifying circuits 202 and 212 are also different from each other, the voltages with different frequencies are not rectified by the rectifying circuits 202 and 212 even in a superposed way. As a result, AC power to be supplied to the loads 402 and 412 do not affect each other. Thus, even if the power reception antenna 201 and the added power reception antenna 211 of the power reception unit 200 are closely disposed, the alternating voltages output from the AC power sources 401 and 411 are independently restorable with high accuracy and are then suppliable to the loads 402 and 412, respectively.

In the above-described example case, electric power output from the AC power sources 401 and 411 of the two independent sets is supplied to the load 402 and 412 of the two independent sets, respectively, at different frequencies at the same time. However, three or more independent AC power sources and three or more independent loads are also applicable. In this case, a switching circuit, a power transmission antenna, a power reception antenna, and a rectifying circuit may be additionally disposed on the top.

As descried above, referring to FIG. 4, the frequency division circuit 106 serving as a frequency changing unit changes the frequency of the first clock signal generated by the clock generation circuit 105 and outputs the resultant clock signal to the switching circuit 102. The switching circuit 102 switches AC power at a timing based on the clock signal output from the frequency division circuit 106.

The frequency division circuit 208 changes the frequency of the first clock signal output from the clock reception circuit 204 and outputs the resultant clock signal to the clock switching circuit 207. In a case where the amount of electric power detected by the detection unit 205 is smaller than a threshold value, the clock switching circuit 207 selects the clock signal output from the frequency division circuit 208.

The control system 300 in FIG. 5 will now be described below. The frequency division circuit 116 changes the frequency of the first clock signal generated by the clock generation circuit 105 and outputs the resultant clock signal. The switching circuit 112 switches other AC power at a timing based on the clock signal output from the frequency division circuit 116, and wirelessly transmit the switched AC power via the power transmission antenna 111.

The frequency division circuit 218 changes the frequency of the first clock signal output from the clock reception circuit 204 and outputs the resultant clock signal. The detection unit 215 detects the amount of electric power and the switching timing of the AC power wirelessly transmitted by the switching circuit 112. The clock generation circuit 216 generates a clock signal based on the switching timing detected by the detection unit 215.

In a case where the amount of electric power detected by the detection unit 215 is a third amount of electric power, the clock switching circuit 217 selects the clock signal generated by the clock generation circuit 216. In a case where the amount of electric power detected by the detection unit 215 is a fourth amount of electric power that is smaller than the third amount of electric power, the clock switching circuit 217 selects the clock signal output from the frequency division circuit 218. The rectifying circuit 212 switches the AC power wirelessly transmitted by the switching circuit 112, at a timing based on the clock signal selected by the clock switching circuit 217.

According to the second example embodiment, providing the frequency division circuits 106, 116, 208, and 218 enables application of a suitable alternating voltage to the plurality of loads 402 and 412.

Figure 7:
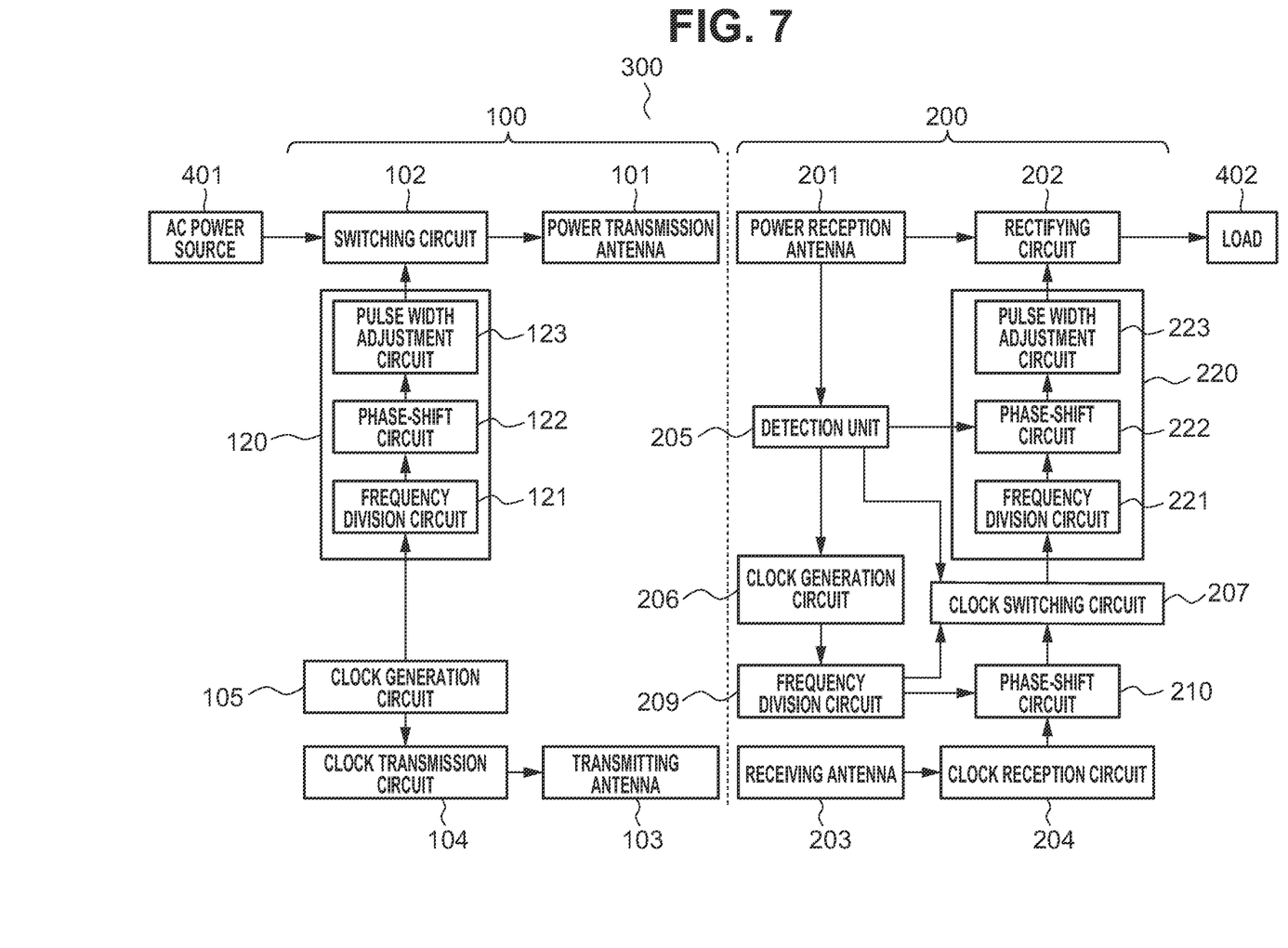
FIG. 7 is a block diagram illustrating an example configuration of a control system.

A third example embodiment of the present disclosure will be described below. FIG. 7 is a block diagram illustrating an example configuration of the control system 300 according to the third embodiment.

The control system 300 in FIG. 7 includes the control system 300 in FIG. 1, and additionally includes a first control circuit 120, a frequency division circuit 209, a phase-shift circuit 210, and a second control circuit 220. The power transmission unit 100 includes the first control circuit 120. The power reception unit 200 includes the frequency division circuit 209, the phase-shift circuit 210, and the second control circuit 220. The first control circuit 120 includes a frequency division circuit 121, a phase-shift circuit 122, and a pulse width adjustment circuit 123. The second control circuit 220 includes a frequency division circuit 221, a phase-shift circuit 222, and a pulse width adjustment circuit 223. Differences of the third embodiment from the first and the second example embodiments will be described below.

The first clock generation circuit 105 of the power transmission unit 100 transmits the generated first clock signal to the first control circuit 120. The first control circuit 120 changes the frequency, phase, and pulse width of the first clock signal generated by the first clock generation circuit 105, through the frequency division circuit 121, the phase-shift circuit 122, and the pulse width adjustment circuit 123, and transmits the first clock signal after the changes to the switching circuit 102. Thus, the first control circuit 120 controls the switching timing of the switching circuit 102. The first control circuit 120 may be, for example, a micro control unit (MCU).

The switching circuit 102 performs switching based on the frequency changed by the first control circuit 120. Thus, the frequency of the switching timing to be detected by the detection unit 205 is also the one that has been changed by the first control circuit 120. The frequency of the second clock signal to be generated by the second clock generation circuit 206 based on the timing detected by the detection unit 205 is the one that has been changed in a similar way. The frequency division circuit 209 changes the frequency of the second clock signal generated by the second clock generation circuit 206 to the frequency of the first clock signal generated by the first clock generation circuit 105.

The frequency of the first clock signal output from the clock reception circuit 204 remains the original frequency of the first clock signal generated by the first clock generation circuit 105. The phase-shift circuit 210 shifts the phase of the first clock signal output from the clock reception circuit 204 so as to be in phase with the second clock signal output from the frequency division circuit 209, and transmits the first clock signal to the clock switching circuit 207.

The frequency division circuit 209 further transmits the second clock signal after the change to the clock switching circuit 207. Thus, the first clock signal phase-shifted by the phase-shift circuit 210 and the second clock signal resulting from change performed by the frequency division circuit 209 are input to the clock switching circuit 207. The first and second clock signals to be input to the clock switching circuit 207 are in phase with each other by the phase-shift circuit 210. As in the first example embodiment, the phase-shift circuit 210 may shift the phases in the initial operation for synchronization and then subsequently maintain the phases.

The clock switching circuit 207 selects the first or second clock signal based on the amount of electric power detected by the detection unit 205, and outputs the selected clock signal to the second control circuit 220.

As in the first example embodiment, in a case where the amount of electric power is smaller than a threshold value, the clock switching circuit 207 selects the first clock signal. In a case where the amount of electric power is larger than the threshold value, the clock switching circuit 207 selects the second clock signal.

The second control circuit 220 changes the frequency, phase, and pulse width of the selected first or second clock signal by using the frequency division circuit 221, the phase-shift circuit 222, and the pulse width adjustment circuit 223, and transmits the first or second clock signal after the changes to the rectifying circuit 202. Thus, the second control circuit 220 controls the switching timing of the rectifying circuit 202. The second control circuit 220 may be, for example, an MCU.

The second control circuit 220 may change the frequency of the clock signal output from the clock switching circuit 207 to the same frequency as the frequency resulting from the change in the first control circuit 120, and then shift the phase of the clock signal so as to be in phase with the switching timing detected by the detection unit 205. As in the first example embodiment, the second control circuit 220 may shift the phases in the initial operation for synchronization and then subsequently maintain the phases.

Further, the first control circuit 120 and the second control circuit 220 can change the pulse width of the clock signals via the pulse width adjustment circuits 123 and 223, respectively. For example, the pulse width adjustment circuits 123 and 223 can provide dead time in the clock signal by changing the pulse width. Providing dead time enables restricting a through-current in the switching circuit 102 and the rectifying circuit 202 and reducing a switching loss.

As in the second example embodiment, the third example embodiment enables the switching circuit 102 and the rectifying circuit 202 to perform synchronized switching at a certain frequency. Thus, electric power output from a plurality of independent AC power sources 401 may be wirelessly supplied to a plurality of independent loads 402 at different frequencies at the same time. In such a case, the clock switching circuit 207 and the like may be provided only for the AC power source 401 and the load 402 of the first set that performs the wireless power transmission by using the power transmission antenna 101 and the power reception antenna 201 adjacent to the transmitting antenna 103 and the receiving antenna 203 in FIG. 6. The clock switching circuit 207 may be unused for the AC power source 411 and the load 412 of the second set that uses the power transmission antenna 111 and the power reception antenna 211 which are separate from the transmitting antenna 103 and the receiving antenna 203, and for the third and the subsequent sets disposed above the second set. The second clock generation circuit 206, the clock switching circuit 207, the frequency division circuit 209, and the phase-shift circuit 210 are not disposed in the second and the subsequent sets. It is sufficient that the output of the clock switching circuit 207 disposed only in the first set is input to the second control circuit 220 for each of the second and subsequent sets.

It is sufficient that the detection unit 205 detects only timing. The second control circuit 220 may only change the frequency of the clock signal received from the clock switching circuit 207 to the same frequency as the first control circuit 120, and then shift the phase of the clock signal so as to be in phase with the timing detected by the detection unit 205 to achieve the synchronization.

It is sufficient that the clock generation circuit 206, the clock switching circuit 207, the frequency division circuit 209, and the phase-shift circuit 210 are disposed only in the first set because the power reception antenna 201 adjacent to the receiving antenna 203 is likely to be subjected to noise superposition on the receiving antenna 203 due to electromagnetic interference. In the first set, the clock signal generated by the first clock generation circuit 105 can be constantly and correctly obtained by using the clock switching circuit 207. Thus, in the second and subsequent sets, it is sufficient that the clock signal output from the clock switching circuit 207 is used. For the synchronization between the switching circuit 102 and the rectifying circuit 202 of the second and subsequent sets, the switching frequency differs for the frequency division circuit 121 of the second and subsequent sets. Thus, the synchronization is achieved by using the detection unit 205 and the second control circuit 220 in each set. In the second and the subsequent sets, the switching frequency does not need to be different for each set but may be identical for all sets. In a case where electromagnetic interference produces adverse effect, the interference can be restrained by frequency separation.

For the clock switching circuit 207, the threshold value of the amount of electric power may be freely determined and a hysteresis characteristic may be provided. This enables prevention of chattering which occurs in a case where the amount of electric power detected by the detection unit 205 frequently exceeds the threshold value. Alternatively, the clock switching circuit 207 may be provided with two different threshold values, and the amount of electric power to be detected by the detection unit 205 may be divided into three different levels (a large, a middle, and a small amount of electric power). The clock switching circuit 207 may select the second clock signal in the case of a large amount of electric power, and select the first clock signal in the case of a small amount of electric power. In the case of a middle amount of electric power, the clock switching circuit 207 may output a clock signal which is the sum of the first and second clock signals through an OR circuit. Providing the middle level enables the clock switching circuit 207 to prevent the clock signal loss and surge occurrence during switching. Even if either one clock signal fails because of external noise and the like, the other clock signal enables enhancement of error control.

The frequency division circuits may be provided with a filter to adjust bands to eliminate noise in the clock signals, and the original clock signals may be maintained without reaction to a single occurrence of noise. This improves the reliability of the clock signals to a further extent.

The power transmission antenna 101 and the power reception antenna 201 may be formed of wiring on a printed circuit board. A magnetism sheet may be stuck on the printed circuit board to reduce signal loss and electromagnetic noise emission at the time of electromagnetic field coupling. The power transmission antenna 101 and the power reception antenna 201 may be a winding transformer using a magnetic substance such as ferrite and a wiring such as a litz wire.

Electric field coupling, magnetic field coupling, optical coupling, acoustic wave coupling, and any combination of these coupling methods are applicable to the coupling between the power transmission antenna 101 and the power reception antenna 201 and the coupling between the transmitting antenna 103 and the receiving antenna 203.

As described above, the frequency division circuit 121 changes the frequency of the first clock signal generated by the clock generation circuit 105 and outputs the resultant clock signal. The phase-shift circuit 122 and the pulse width adjustment circuit 123 can be deleted. The switching circuit 102 switches AC power at a timing based on the clock signal output from the frequency division circuit 121.

The frequency division circuit 209 changes the frequency of the second clock signal generated by the clock generation circuit 206 and outputs the resultant clock signal. The phase-shift circuit 210 as a phase-shift unit shifts the phase of the first clock signal output from the clock reception circuit 204 so as to be in phase with the signal output from the frequency division circuit 209.

The frequency division circuit 221 changes the frequency of the clock signal selected by the clock switching circuit 207 and outputs the resultant clock signal. The phase-shift circuit 222 and the pulse width adjustment circuit 223 can be deleted. The rectifying circuit 202 switches AC power wirelessly transmitted by the switching circuit 102, at a timing based on the clock signal output from the frequency division circuit 221.

The second set will now be described below. In the second set, the clock switching circuit 207 can be omitted. The frequency division circuit 121 of the second set changes the frequency of the first clock signal generated by the clock generation circuit 105 and outputs the resultant clock signal. The switching circuit 102 of the second set switches the other AC power at a timing based on the clock signal output from the frequency division circuit 121 of the second set, and wirelessly transmits the switched AC power via the power transmission antenna 101 of the second set.

The frequency division circuit 221 of the second set changes the frequency of the clock signal selected by the clock switching circuit 207 and outputs the resultant clock signal. The rectifying circuit 202 of the second set switches the AC power wirelessly transmitted by the switching circuit 102 of the second set, at a timing based on the clock signal output from the frequency division circuit 221 of the second set.

The pulse width adjustment circuits 123 and 223 are also applicable to the first and the second example embodiments. The pulse width adjustment circuit 123 serving as a pulse width adjustment unit adjusts the pulse width of the clock signal to be input to the switching circuit 102. The pulse width adjustment circuit 223 adjusts the pulse width of the clock signal to be input to the rectifying circuit 202.

According to the present example embodiment, providing the frequency division circuits 121 and 221 enables suitable application of alternating voltage to a plurality of the loads 402. The clock switching circuit 207 of the second and the subsequent sets can be omitted by sharing the clock switching circuit 207 in a plurality of sets.

Each of the above-described example embodiments is to be considered as illustrative in embodying features of the present disclosure, and is not to be interpreted as restrictive on the technical scope of the present invention. Embodiments of the present disclosure are not limited to these example embodiments but can be modified and changed in diverse ways.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-173776, filed Oct. 25, 2021, which is hereby incorporated by reference herein in its entirety.

What is claimed is:

1. A control system comprising:
a power transmission unit configured to wirelessly transmit alternating-current power; and
a power reception unit configured to receive the alternating-current power wirelessly transmitted from the power transmission unit,
wherein the power transmission unit comprises:
a first switching unit configured to switch the alternating-current power at a timing based on a first clock signal and wirelessly transmit the switched alternating-current power; and
a clock transmission unit configured to wirelessly transmit the first clock signal, and
wherein the power reception unit comprises:
a clock reception unit configured to receive the first clock signal wirelessly transmitted from the clock transmission unit;
a first detection unit configured to detect an amount of electric power and a switching timing of the alternating-current power wirelessly transmitted by the first switching unit;
a first clock generation unit configured to generate a second clock signal based on the switching timing detected by the first detection unit;
a first clock selection unit configured to select a clock signal based on the first or second clock signal in accordance with the amount of electric power detected by the first detection unit; and
a first rectifying unit configured to switch the alternating-current power wirelessly transmitted by the first switching unit at a timing based on the clock signal selected by the first clock selection unit.

2. The control system according to claim 1, wherein, in a case where the amount of electric power detected by the first detection unit is a first amount of electric power, the first clock selection unit selects the second clock signal, and in a case where the amount of electric power detected by the first detection unit is a second amount of electric power smaller than the first amount of electric power, the first clock selection unit selects a clock signal based on the first clock signal output from the clock reception unit.

3. The control system according to claim 2, wherein, in a case where the amount of electric power detected by the first detection unit is the second amount of electric power, the first clock selection unit selects a clock signal obtained by shifting a phase of the first clock signal output from the clock reception unit so as to be in phase with the switching timing detected by the first detection unit.

4. The control system according to claim 3, wherein, during a time period in which the alternating-current power wirelessly transmitted by the first switching unit is higher than a lower limit of a detection limit of the first detection unit, the first clock selection unit shifts the phase of the first clock signal so as to be in phase with the switching timing detected by the first detection unit, and subsequently maintains the amount of phase shift of the phase shifting.

5. The control system according to claim 4, wherein the time period in which the alternating-current power is higher than the lower limit includes a time period immediately after the control system is activated.

6. The control system according to claim 2,
wherein the power transmission unit further comprises a first frequency changing unit configured to change a frequency of the first clock signal and output the resultant clock signal to the first switching unit,
wherein the power reception unit further comprises a second frequency changing unit configured to change the frequency of the first clock signal output from the clock reception unit and output the resultant clock signal to the first clock selection unit,
wherein the first switching unit switches the alternating-current power at a timing based on the clock signal output from the first frequency changing unit, and
wherein, in a case where the amount of electric power detected by the first detection unit is the second amount of electric power, the first clock selection unit selects the clock signal output from the second frequency changing unit.

7. The control system according to claim 6,
wherein the power transmission unit further comprises:
a third frequency changing unit configured to change the frequency of the first clock signal and output the resultant clock signal; and
a second switching unit configured to switch other alternating-current power at a timing based on the clock signal output from the third frequency changing unit and wirelessly transmit the switched alternating-current power, and
wherein the power reception unit further comprises:
a fourth frequency changing unit configured to change the frequency of the first clock signal output from the clock reception unit and output the resultant clock signal;
a second detection unit configured to detect an amount of electric power and a switching timing of the alternating-current power wirelessly transmitted by the second switching unit;
a second clock generation unit configured to generate a third clock signal based on the switching timing detected by the second detection unit;
a second clock selection unit configured to select the third clock signal or the clock signal output from the fourth frequency changing unit in accordance with the amount of electric power detected by the second detection unit; and
a second rectifying unit configured to switch the alternating-current power wirelessly transmitted by the second switching unit at a timing based on the clock signal selected by the second clock selection unit.

8. The control system according to claim 7,
wherein, in a case where the amount of electric power detected by the second detection unit is a third amount of electric power, the second clock selection unit selects the third clock signal, and in a case where the amount of electric power detected by the second detection unit is a fourth amount of electric power smaller than the third amount of electric power, the second clock selection unit selects the clock signal output from the fourth frequency changing unit.

9. The control system according to claim 1,
wherein, in a case where the amount of electric power detected by the first detection unit is larger than a threshold value, the first clock selection unit selects the second clock signal, and in a case where the amount of electric power detected by the first detection unit is smaller than the threshold value, the first clock selection unit selects a clock signal based on the first clock signal output from the clock reception unit.

10. The control system according to claim 9, wherein the threshold value has a hysteresis characteristic.

11. The control system according to claim 1, wherein the first clock selection unit performs
selecting the second clock signal in a case where the amount of electric power detected by the first detection unit is larger than a first threshold value;
selecting a clock signal based on the first clock signal output from the clock reception unit in a case where the amount of electric power detected by the first detection unit is smaller than a second threshold value; and
selecting a clock signal which is the sum of the first and second clock signals output from the clock reception unit in a case where the amount of electric power detected by the first detection unit is smaller than the first threshold value and larger than the second threshold value.

12. The control system according to claim 1,
wherein the power transmission unit further comprises a first frequency changing unit configured to change a frequency of the first clock signal and output the resultant clock signal,
wherein the power reception unit further comprises:
a second frequency changing unit configured to change a frequency of the second clock signal and output the resultant clock signal;
a phase-shift unit configured to shift a phase of the first clock signal output from the clock reception unit so as to be in phase with the clock signal output from the second frequency changing unit; and
a third frequency changing unit configured to change a frequency of the clock signal selected by the first clock selection unit and output the resultant clock signal,
wherein the first switching unit switches the alternating-current power at a timing based on the clock signal output from the first frequency changing unit, and
wherein the first rectifying unit switches the alternating-current power wirelessly transmitted by the first switching unit at a timing based on the clock signal output from the third frequency changing unit.

13. The control system according to claim 12,
wherein the power transmission unit further comprises:
a fourth frequency changing unit configured to change the frequency of the first clock signal and output the resultant clock signal; and
a second switching unit configured to switch other alternating-current power at a timing based on the clock signal output from the fourth frequency changing unit and wirelessly transmit the switched alternating-current power, and
wherein the power reception unit further comprises:
a fifth frequency changing unit configured to change the frequency of the clock signal selected by the first clock selection unit and output the resultant clock signal; and
a second rectifying unit configured to switch the alternating-current power wirelessly transmitted by the second switching unit, at a timing based on the clock signal output from the fifth frequency changing unit.

14. The control system according to claim 1,
wherein the power transmission unit further comprises a first pulse width adjustment unit configured to adjust a pulse width of a clock signal to be input to the first switching unit, and wherein the power reception unit further comprises a second pulse width adjustment unit configured to adjust a pulse width of a clock signal to be input to the first rectifying unit.

15. The control system according to claim 1, wherein each of the first switching unit and the first rectifying unit performs switching by using a bidirectional switch.

16. The control system according to claim 1,
wherein the first switching unit wirelessly transmits the switched alternating-current power via a power transmission antenna,
wherein the first rectifying unit receives the alternating-current power wirelessly transmitted from the first switching unit via a power reception antenna,
wherein the clock transmission unit wirelessly transmits the first clock signal via a transmitting antenna, and
wherein the clock reception unit receives the first clock signal wirelessly transmitted from the clock transmission unit via a receiving antenna.

17. The control system according to claim 16,
wherein the power reception antenna is relatively movable with respect to the power transmission antenna, and
wherein the receiving antenna is relatively movable with respect to the transmitting antenna.

18. The control system according to claim 1, wherein the power transmission unit further comprises a third clock generation unit configured to generate the first clock signal.

19. A method for controlling a control system comprising a power transmission unit configured to wirelessly transmit alternating-current power, and a power reception unit configured to receive the alternating-current power wirelessly transmitted from the power transmission unit, the method comprising:
   switching the alternating-current power at a timing based on a first clock signal and wirelessly transmitting the switched alternating-current power using a first switching unit of the power transmission unit;
   wirelessly transmitting the first clock signal using a clock transmission unit of the power transmission unit;
   receiving the first clock signal wirelessly transmitted from the clock transmission unit using a clock reception unit of the power reception unit;
   detecting an amount of electric power and a switching timing of the alternating-current power wirelessly transmitted by the first switching unit using a first detection unit of the power reception unit;
   generating, using a first clock generation unit of the power reception unit, a second clock signal based on the switching timing detected by using the first detection unit; and
   selecting, using a first clock selection unit of the power reception unit, a clock signal based on the first or second clock signal in accordance with the amount of electric power detected by using the first detection unit; and
   switching, using a first rectifying unit of the power reception unit, the alternating-current power wirelessly transmitted by using the first switching unit at a timing based on the clock signal selected by using the first clock selection unit.

* * * * *